Patented Jan. 1, 1952

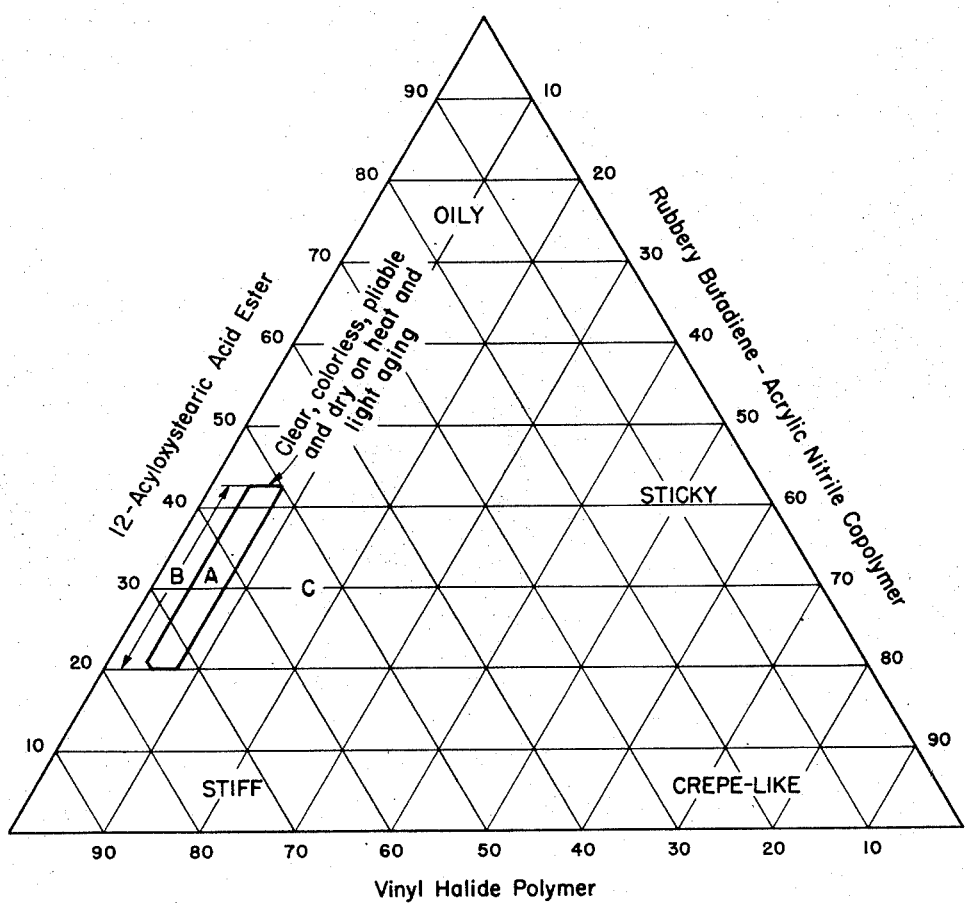

2,580,460

UNITED STATES PATENT OFFICE 2,580,460

STABILIZATION OF VINYL HALIDE POLYMERS

Temple C. Patton and Louis J. Jubanowsky, Mountainside, N. J., assignors to The Baker Castor Oil Company, Jersey City, N. J., a corporation of New Jersey Application May 24, 1950, Serial No. 163,956

8 Claims. (Cl. 260—32.2)

This invention relates to the production of vinyl halide polymer compositions which are stable upon exposure to heat and/or light. The invention particularly relates to the production of such compositions which contain, in addition to (a) a polyvinyl halide, (b) a substantially saturated fatty acid ester as the plasticizer, and (c) a rubbery butadiene-acrylonitrile copolymer as the stabilizer.

The use of the plasticizers of this invention represents an advance over the prior practice of using unsaturated fatty acid esters as plasticizers for vinyl halide polymers. The unsaturated esters develop rancidity and show exudation tendencies upon aging or heating of the films in which they are employed as the plasticizer. Such difficulties are overcome by the use of the plasticizers of this invention. Vinyl halide polymers containing the plasticizers of this invention have superior characteristics in regard to heat stability, volatility of the plasticizer, tensile strength, rancidity, modulus, elongation, hardness, permanent set, and water extractability. However, it has been found that vinyl halide polymers containing the plasticizers of this invention, but in the absence of the stabilizers of this invention, are not completely satisfactory in their stability to light.

As regards the stabilizers used in the prior art, it has been found that none of them give the exceptional results obtained with the stabilizer of this invention. While rubbery butadiene-acrylonitrile copolymers have previously been blended with vinyl halide polymers, such rubbery copolymers have not been previously used in compositions such as those of this invention in stabilizing amounts. The amounts of the rubbery copolymer used in the prior art, in the absence of the plasticizers of this invention, resulted in compositions which were objectionably unstable on exposure to heat, and became embrittled on exposure to light.

It is an object of this invention to prepare polymer compositions which are stable on exposure to heat and/or light. It is a further object of this invention to produce stabilized compositions of the indicated type from materials which are readily available in commerce. Additional objects will be apparent from the following description of the invention.

This invention is particularly applicable to the polymers and copolymers of vinyl halide. Among the copolymers which may be stabilized according to this invention are the copolymers of vinyl halide with vinyl esters of fatty acids, with vinylidene halides, and the like.

The plasticizers which form an integral part (component (b)) of the compositions of this invention are the esters of 12-hydroxystearic acid. Such esters are substantially saturated compounds; it is important and advantageous that, in order to contribute to the effectiveness of this invention, they have iodine numbers of not more than about 15.

The synthetic rubbery butadiene-acrylonitrile copolymers, which act as the stabilizing ingredient of the compositions of this invention, are well known per se. In general, they consist of copolymers which are formed from a mixture comprising a butadiene-1,3, such as butadiene-1,3, isoprene, 1-methyl-1,3-butadiene, 2,3-dimethyl-1,3-butadiene, and 2-chloro-1,3-butadiene, and an acrylic nitrile, such as acrylonitrile, methacrylonitrile, ethyl acrylonitrile, propyl acrylonitrile, and chloro acrylonitrile, in the proportion of about 1.22 to about 5.67 parts of the butadiene component per part of acrylic nitrile.

While it was known previously that vinyl halide polymers which have been plasticized with esters of 12-hydroxystearic acid are stable upon exposure to heat, the light stability of such plasticized polymers is not completely satisfactory. However, it has now been found that when from about 4.0 to about 7.5% by weight of a butadiene-acrylonitrile rubber, based on the combined weight of vinyl resin, plasticizer, and synthetic rubber, is incorporated in the plasticized vinyl resin, the resulting composition is effectively heat- and light-stabilized. The amount of synthetic rubber used is critical, as shown by the fact that, when less than 4.0% by weight of the rubber is used, films prepared from such a composition become brown, spotted, and very sticky when exposed to ultraviolet light; and, when more than 7.5% by weight of the rubber is used, the films become undesirably colored on heat aging.

There has been no previous indication of the effectiveness of the butadiene-acrylic nitrile rubbers as light stabilizers for vinyl halide polymers. Nor has there been any prior indication of their specific usefulness with the particular plasticizers of this invention. In fact, the effectiveness of the butadiene-acrylic nitrile rubbers in combination with the 12-hydroxystearic acid esters appears to be synergistic. As indicated, the vinyl polymer-plasticizer compositions are not suitably stable to the action of light. Whereas, vinyl polymer compositions containing butadiene-acrylic nitrile rubbers, but no plasticizer, become stiff and discolored on being light-aged. However, the combination of all three ingredients in optimum amounts gives a highly satisfactory composition in all respects, including stability to heat and light.

This invention is applicable to polymers of vinyl halides generally. Examples of such polymers which may be stabilized according to this invention are the compounds formed by the polymerization of vinyl chloride, vinyl bromide, or vinyl iodide, and by the conjoint polymerization of mixtures of vinyl halides and vinyl esters of aliphatic acids, or of mixtures of vinyl halides and vinylidene halides. Preferred copolymers of the latter types may be prepared by the copolymerization of mixtures of vinyl chloride and vinyl acetate containing from about 60% to about 95% by weight of vinyl chloride, and especially those containing from 85% to 95% by weight of vinyl chloride; or by the copolymerization of mixtures of vinyl chloride and vinylidene chloride containing from about 95% to about 99% by weight of vinyl chloride. Other suitable vinyl halide copolymers are those formed by copolymerization of vinyl chloride with vinyl propionate, vinyl butyrate, and vinyl chloracetate, as well as with vinyl esters of mixed aliphatic-aromatic carboxylic acids, such as a vinyl ester of phenyl acetic acid. Particularly useful vinyl halide polymers are those which contain from about 10 to about 50% of the vinyl carboxylates, i. e., vinyl esters of aliphatic or substituted aliphatic acids, based on the vinyl chloride. Other vinyl halide copolymers useful in the compositions of this invention include copolymers of vinyl chloride with a small proportion of vinyl cyanide, styrene, methyl methacrylate, or the like.

The plasticizing esters, according to this invention, conform generally to the formula:

wherein R' is an acyl group derived from a monocarboxylic acid selected from the group consisting of aliphatic, cyclo-aliphatic, araliphatic, aromatic, and heterocyclic acids containing less than 23 carbon atoms per molecule, and R" is a monovalent radical derived from a monohydric compound selected from the group consisting of aliphatic, cycloaliphatic, araliphatic, and heterocyclic alcohols, phenols, and alkoxy-substituted derivatives of said alcohols and phenols. The acyloxy group of the 12-acyloxy stearic acid esters may be derived from any of the monocarboxylic acids of which the following are exemplary: acetic, butyric, caproic, heptoic, caprylic, capric, undecylenic, lauric, oleic, ricinoleic, stearic, erucic; naphthenic, abietic, hexahydrobenzoic; benzoic, salicyclic, naphthoic, toluic; nicotinic, furoic, furylacrylic.

The monohydric alchol type compounds from which the monovalent radical R" is derived include the following exemplary compounds: methyl, ethyl, propyl, iso-propyl, n-butyl, sec-butyl, t-butyl, heptyl, n-octyl, 2-ethyl-hexyl, nonyl, decyl, undecylenyl, oleyl, ricinoleyl, stearyl alcohols; cyclohexyl, methyl-cyclohexyl, cyclopentyl, abietyl alcohols; benzyl, phenyl-ethyl alcohols; tetrahydrofurfuryl, furfuryl alcohols; beta - hydroxypyridine; 2 - methoxy-ethyl, 3 - ethoxy-propyl, 2-butoxy-ethyl, 2-benzyloxy-ethyl, and mono-methyl ethers of diethylene glycol; mono-butyl ether of dipropylene glycol; phenol, o-cresol, sym.-xylenol, 2-naphthol, 1-methyl-2-napthol.

The esters are most conveniently prepared commercially by preparing the ester of ricinoleic acid with the desired alcohol or phenolic compound. As shown below, in the examples, the reaction may be effected directly by an ester-interchange between castor oil and the desired alcohol. The acylation of the ricinoleic acid ester is then carried out, and this step is followed by catalytic hydrogenation.

An alternative, but not the preferred, method of preparing the esters involves the acylation of the 12-hydroxy stearic acid esters as the last step in the process, the preparation and hydrogenation of the ricinoleic acid esters being the prior steps. While this order of preparation may be followed, it requires the use of special insulation, steam jacketing, and similar precautions to keep the materials molten in the reaction vessels and in the connecting pipe lines, since these hydrogenated esters are waxy materials prior to acylation.

The preparation of a representative number of examples of the 12-acyloxy stearic acid esters is described in detail in the following examples, wherein the parts are expressed in terms of weight, unless otherwise specified. In these examples, the preferred stages of preparation involve, first, esterification of ricinoleic acid (or castor oil), then, acylation, and, finally, hydrogenation. The esterification is carried out in the normal manner, using an acid catalyst, such as sulfuric acid, or an alkaline catalyst, such as sodium hydroxide; the final reaction mixture is neutralized, freed from excess alcohol or phenolic compounds, and the resulting ester is polished and dried. This intermediate ester is acylated by usual techniques, using a mono-carboxylic acid, or a halide or anhydride thereof. The acylated esters are then hydrogenated under rather mild conditions, using a nickel catalyst, relatively low pressures (e. g., about 250 to 300 pounds per square inch), and moderate temperatures of from about 100° to 125° C.

EXAMPLE 1

*Preparation of methyl 12-acetoxy stearate.*—
400 parts of castor oil (free fatty acid content: 0.10%) were charged to a still, together with 124 parts of methyl alcohol containing 2.0 parts of sodium hydroxide. Agitation was used to promote the reaction. The reaction was allowed to proceed for a period of 25 minutes at a temperature of 25°–30° C. At the end of this time, the agitation was stopped and the reaction mixture was neutralized with phosphoric acid, which was added in slight excess so as to eliminate the possibility of emulsion formation. Heat was then applied to the still so as to effect the distillation of the unreacted methyl alcohol. Near the end of the distillation, sparging steam was introduced into the still to aid in the removal of the last traces of alcohol. After the still contents had been cooled, they were placed in a separator; the glycerine layer was withdrawn from the separator by gravity. The remaining mixture was washed countercurrently in the apparatus described in Colbeth U. S. Patent No. 2,249,746. After drying, the methyl ester of castor oil fatty acids had the following physical constants: refractive index at 25° C. was 1.4619; specific gravity at 15° C. was 0.929; viscosity (Gardner-Holdt) was A. The free fatty acid content of this ester was 0.10%.

The methyl ester thus obtained was then acetylated by refluxing 587 parts of the methyl ester with 179.5 parts of acetic anhydride for approximately one hour. At the end of this time, the acetic acid and unreacted acetic anhydride were distilled off, and the resulting ester was deodorized by sparging with steam under vacuum to free it from the final traces of acetic anhydride and acid. The resulting ester had a refractive index of 1.4548, a saponification value of 299.0, and an iodine value of 76.0. This ester was catalytically hydrogenated to an iodine value of 4.1, the final product being methyl 12-acetoxy stearate.

EXAMPLE 2

*Preparation of the 2-methoxyethyl ester of 12-acetoxy stearic acid.*—300 parts of castor oil (having a free fatty acid content of 0.3%) were reacted with 220 parts of 2-methoxy-ethanol in the presence of 3 parts of a 50% aqueous solution of sodium hydroxide for 2 hours at 25-30° C. At the end of this time, the catalyst was neutralized with dilute phosphoric acid; the excess methoxyethanol was distilled from the reaction mixture under vacuum; the distillation residue was water-washed in an apparatus similar to that described in Colbeth U. S. Patent No. 2,249,746; and the separated ester was dried under vacuum. The 2-methoxyethyl ricinoleate prepared had the following constants: refractive index, 1.4648; spec. gravity (15° C.), 0.954; viscosity (Gardner-Holdt), A; saponification value, 158.8.

587 parts of the 2-methoxyethyl ricinoleate were mixed with 207 parts of acetic anhydride, and the mixture was refluxed gently for 1 hour. At the end of this time, the acetic acid and excess acetic anhydride were distilled off, and the remaining ester was deodorized by steam sparging under vacuum. The product had a refractive index of 1.4570, a saponification value of 286.2, and an iodine value of 68.0. The product was then hydrogenated catalytically to an iodine value of 2.2, the hydrogenated ester being the 2-methoxyethyl ester of 12-acetoxy stearic acid.

EXAMPLE 3

*Preparation of benzyl 12-propionoxy stearate.*— 0.3 part of sodium hydroxide was dissolved in 60 parts of warm benzyl alcohol. 100 parts of castor oil were added, and the mixture was held at 150° C. for two hours. After cooling, the reaction product was washed, dried, and freed from excess alcohol by heating under vacuum. The refractive index of the benzyl ricinoleate was 1.4900.

320 parts of benzyl ricinoleate were mixed with 132 parts of propionic anhydride and the mixture was refluxed gently for 1 hour. At the end of this time, the propionic acid and excess propionic anhydride were distilled off, and the remaining ester was deodorized by steam sparging under vacuum. The resulting light-colored ester was then hydrogenated catalytically to an iodine value of 10, the final product being benzyl 12-propionoxy stearate.

EXAMPLE 4

*Preparation of cyclohexyl 12-stearoxy stearate.*—75 parts of cyclohexyl alcohol, containing 0.25 part of sodium hydroxide, were mixed and heated with 100 parts of castor oil at 150° C. for three hours. After cooling, the reaction product was washed, dried, and freed from excess alcohol by heating under vacuum. 350 parts of the resulting cyclohexyl ricinoleate were mixed and heated with 265 parts of stearic acid at 200°–210° C. for four hours. During this heating period, the reaction mixture was gently agitated with $CO_2$ gas. After being washed with methyl alcohol, the product was hydrogenated catalytically to an iodine value of 7.5.

EXAMPLE 5

*Preparation of tetrahydrofurfuryl 12-abietoxy stearate.*—300 parts of ricinoleic acid and 150 parts of tetrahydrofurfuryl alcohol, together with 3 parts of sulfuric acid and 100 cc. of toluene, were refluxed for 2.5 hours. A water trap in the condenser system allowed the separation of the water formed in the esterification reaction and the return of the toluene to the reaction zone. The cooled product was neutralized, washed, dried, and residual toluene, as well as excess alcohol, were separated by distillation under vacuum. 300 parts of the resulting ester were then heated with 225 parts of abietic acid at 250° C. for 4 hours. The reaction mixture was agitated with $CO_2$ gas during this period. The cooled ester was washed with methyl alcohol, and then catalytically hydrogenated to an iodine value of 15.

EXAMPLE 6

*Preparation of phenyl 12-toluoxy stearate.*—110 parts of thionyl chloride were slowly added to a mixture of 90 parts of phenol and 285 parts of ricinoleic acid. When the thionyl chloride addition was completed, the reaction mixture was heated to drive off all of the HCl and $SO_2$. The resulting phenyl ricinoleate was purified by vacuum distillation. 300 parts of the purified ester were then heated with 110 parts of p-toluic acid for 4.5 hours at 185° C. The product was then cooled, washed with methyl alcohol, and catalytically hydrogenated to an iodine value of 3.8.

EXAMPLE 7

*Preparation of the 2-ethylhexyl ester of 12-furoxy stearic acid.*—4 cc. of concentrated sulfuric acid were dissolved in 2000 gms. of 2-ethylhexanol. 1600 gms. of castor oil were then added, and the mixture was refluxed for one hour. The resulting product was washed and dried. The saponification value of the 2-ethylhexyl ricinoleate was 137.8, as contrasted to a theoretical value of 136.5.

400 parts of this ricinoleic acid ester were then heated with 110 parts of 3-furoic acid at 150° C. for 4 hours. The resulting ester was washed with methyl alcohol, and then catalytically hydrogenated to an iodine value of 10.5.

EXAMPLE 8

*Preparation of cetyl 12-acetoxy stearate.*—A mixture of 300 parts of ricinoleic acid, 250 parts of cetyl alcohol, 3 parts of sulfuric acid, and 150 cc. of toluene was refluxed for 3 hours. A water trap was arranged in the condenser system so that water formed during the esterification could be separated, and the toluene returned to the reaction zone. The product of this reaction was neutralized, washed, dried, and residual toluene was separated by vacuum distillation. This ester was then acetylated by refluxing with an equal volume of acetic anhydride. The resulting product was washed, dried, and then catalytically hydrogenated to an iodine value of 13.0.

EXAMPLE 9

*Preparation of ester of mono-butyl ether of diethylene glycol and 12-propionoxy stearic acid.*— 1000 cc. of ricinoleic acid and 1000 cc. of the mono-butyl ether of diethylene glycol were refluxed for 3 hours, in the presence of 2% of concentrated HCl, based on the weight of the ricinoleic acid. Also present in the reaction zone were 200 cc. of xylol, which aided in the separation of water in the water trap in the condenser system. The product was neutralized with chalk, bleached with 2% of a neutral reacting, acid-activated bleaching earth and 0.5% of a powdered, activated carbon, filtered and washed thoroughly three times with hot water to remove the excess ether alcohol. It was then dried under vacuum at 140° C., 1400 gms. of ester being obtained. Its properties were as follows: refractive index, 1.4598; specific gravity, 0.949; saponification value, 130.5; acetyl value, 125.2.

Equal volumes of the above ester and propionic anhydride were refluxed for 3 hours. The excess anhydride and acid were then washed out of the product, and the product was dried under vacuum. Catalytic hydrogenation reduced the iodine value of the product to 3.3.

Component C

Satisfactory rubbery butadiene-acrylic nitrile copolymers for use in the compositions of this invention may be formed by the copolymerization of a mixture comprising a butadiene-1,3 and an acrylic nitrile in the proportion of from about 1.22 to about 5.67 parts of the butadiene component per part of acrylic nitrile. Commercially available synthetic rubbers of this type range in composition from Chemigum N3NS (produced by the Goodyear Tire and Rubber Co.), which contains approximately 1.52 parts of butadiene per part of acrylonitrile, to Paracril-18 (a product of Enjay Co.), which contains about 3.97 parts of butadiene per part of acrylonitrile. Intermediate synthetic rubbers of this type are also available from these companies, as well as from the B. F. Goodrich Chemical Co. (Hycars OR-15 and OR-25), and from Xylos Rubber Co. (Butaprenes NAA, NF, NL, and NXM).

THREE COMPONENT SYSTEM OF THIS INVENTION

The accompanying diagram is a representation of the three-component system from which the compositions of this invention are selected. The portion of the diagram marked "A" corresponds to the compositions of this invention, which are clear, colorless, pliable, and dry on being exposed to heat and light. The compositions in the section marked "B" become brown, spotted, and very sticky upon being exposed to ultra violet light. The compositions in the area surrounding "C" become brown on being exposed to heat. The characteristics of the compositions corresponding to the other portions of the diagram are indicated thereon.

Exposure data

Exposure data on the compositions of this invention, together with similar data on unsatisfactory related compositions, are presented in Table I. These data were obtained on 0.010 inch (ten mils) films of the compositions. The procedure used in preparing the test films is as follows, the details of a particular preparation being shown: 195 gms. of polyvinyl chloride are thoroughly premixed with 90 gms. of methyl 12-acetoxy stearate in a metal beaker until a damp powder is formed. This mixture is transferred to a 2-roll mill, the surface temperature of the rolls being 340° F. and the roll clearance being about .020 inch. After a continuous film is formed, 15 gms. of Paracril 26NS60 (previously broken down on a cold mill) are added slowly to the mill. As soon as a rolling bank forms, the charge is removed and recharged six times, the grain direction being changed by 90° with each pass (using the "cigarring" technique). The roll clearance is adjusted to .010 inch, and, after a further milling period of 10 minutes, the film is removed from the mill. This film is cut into sample sizes for testing. Flms of other compositions were prepared in like manner.

The light aging was effected in an accelerated manner by exposing the films (.01" x 2" x 6") to ultraviolet light at a temperature of 50°±2° C. in a Weatherometer (a product of Atlas Electrical Devices Co.); the test atmosphere was humid, but no water spray was used. The heat aging was done in an oven maintained at 100° C. The quantities stated in Table I for the several ingredients of the compositions of this invention are in parts by weight.

The vinyl halide polymers used in the experiments reported in Table I include the following products of the B. F. Goodrich Chemical Co.: Geon 101, polyvinyl chloride; Geon 202, a vinylidene chloride-vinyl chloride copolymer containing a minor amount of vinylidene chloride; Geon Polyblend, a composition consisting of 55% of polyvinyl chloride and 45% of butadiene-acrylonitrile rubber. Other vinyl halide polymers used were the following Carbide and Carbon Chemicals Corp. products: Vinylite VYNS, a vinyl chloride-vinyl acetate copolymer containing 88.5–90.5% of vinyl chloride and having an average molecular weight of 16,000; and VYNW, a vinyl chloride-vinyl acetate copolymer containing 93–95% of vinyl chloride and having an average molecular weight of 24,000.

The rubbery butadiene-acrylonitrile copolymers represented by the data of Table I are Paracril 26NS60, a product of Enjay Co. containing 2.49 parts of butadiene per part of acrylonitrile; Hycar OR-25, a product of the B. F. Goodrich Chemical Co. containing 2.05 parts of butadiene per part of acrylonitrile; Butaprene NF-NSP75, a product of Xylos Rubber Co. containing 3.46 parts of butadiene per part of acrylonitrile; and Chemigum N3, a product of Goodyear Tire and Rubber Co. containing 1.53 parts of butadiene per part of acrylonitrile.

The results appearing in Table I readily show the superiority of the compositions of this invention. Thus, Example 11 shows that undesirable effects are obtained when vinyl resin-acrylonitrile rubber films containing no plasticizer are exposed to heat and light. Attempts were made to prepare films of vinyl resin-acrylonitrile rubber (with no plasticizer) containing these components in the same relative proportions as in the compositions of this invention, in order to obtain comparative exposure data thereon; it was found that such two-component compositions are so extremely stiff that films can't be formed by processing them on a mill. Undesirable results are also effected when films comprising vinyl resin and plasticizer, but containing no acrylonitrile rubber, are exposed to light. This is shown by Examples 12, 16, 20, 30, 36, 41, 49, 51, 53, 55, and 57. Similarly, poor results are secured on light aging when there is too little acrylonitrile rubber in the compositions. This is shown by Examples 37–39 and 42–44. However, when there is too much acrylonitrile rubber in the compositions, poor results are noted when such films are exposed to heat. Examples 15, 18, 19, 23–25, 27–29, 33–35, 48, 50, 52, 53, and 56 illustrate this point. The poor results obtained by light-aging a film containing too much plasticizer are shown in Example 31. Example 70 is of interest in that it shows that a rubber anti-oxidant can not be used to supplant the synthetic rubber in the compositions of this invention. The compositions containing the antioxidant, but none of the synthetic rubber, gave very bad results on light aging. Whereas, the good results achieved when the three-component compositions of this invention are exposed to heat and light are demonstrated by Examples 13, 14, 17, 21, 22, 26, 32, 40, 45–47, and 58–69.

The compositions of this invention may be used for coating fabrics for hospital sheeting, bags, aprons, protective clothing, gloves, and other similar articles, in the production of drapes and upholstery, for lining tanks, for the preparation of threads, films, lacquers, varnishes, and electric insulating material. The compositions may also be used for molded and extruded articles. By dissolving the compositions in suitable solvents, cements for adhesives or for coating purposes may be prepared.

This invention provides plasticized vinyl halide polymer compositions which are stable on exposure to both heat and light. This result is achieved by incorporating small percentages of rubbery butadiene-acrylic nitrile copolymers in the plasticized vinyl halide polymer compositions. Specifically, the compositions of this invention are those which contain from about 50 to about 75% by weight of a vinyl halide polymer, about 20% to about 42.5% by weight of an ester of 12-acyloxystearic acid, and from about 4 to about 7.5% of a rubbery butadiene-acrylic nitrile copolymer. It is to be noted that no heat stabilizing agents are required in the three-component compositions of this invention, since the particular plasticizers present in the compositions render vinyl halide polymers containing them stable to heat.

Numerous other modifications and variations in the invention described herein will be apparent to those skilled in the art and are within the spirit and the scope of the appended claims.

TABLE I

| Expt. No. | Vinyl Resin | Plasticizer | Acrylonitrile Rubber | Weatherometer Light Aging | | | | Heat Aging |
|---|---|---|---|---|---|---|---|---|
| | | | | 25 hrs. | 100 hrs. | 200 hrs. | 300 hrs. | 5 days at 100° C. |
| 11 | Polyvinyl chloride- (in Geon Polyblend) 55 parts. Geon 101: | | 45 (in Geon Polyblend) | | dry; stiff; slightly yellow. | dry; stiff; slightly yellow. | dry; stiff; yellow. | dry; dark yellow. |
| 12 | 70 parts | 30 2-methoxy-ethyl ester of 12-acetoxystearic acid ($I_2$ no.:1.7). | | | very oily; very tacky; brown spots. | extremely tacky; brown spots. | extremely tacky; flexible; brown. | dry; clear; colorless |
| 13 | 70 parts | 25 | 5 Paracril 26NS60 | | dry; flexible; very slightly yellow. | somewhat stiff; very slightly yellow. | flexible; very slightly yellow. | Do. |
| 14 | 70 parts | 22.5 | 7.5 | | do | dry; very slightly yellow. | dry; flexible; very slightly yellow. | Do. |
| 15 | 70 parts | 20 2-methoxy-ethyl ester of 12-acetoxystearic acid ($I_2$ no.:1.7). | 10 Paracril 26NS60 | | dry; flexible; slightly yellow. | dry; somewhat stiff; very slightly yellow. | dry; flexible; slightly yellow. | dry; yellow. |
| 16 | 65 parts | 35 | | | very oily; very tacky; brown spots. | extremely tacky; brown spots. | extremely tacky; flexible; brown. | dry; clear; colorless. |
| 17 | 65 parts | 30 | 5 | | dry; flexible; very slightly yellow. | somewhat stiff; very slightly yellow. | dry; flexible; very slightly yellow. | Do. |
| 18 | 65 parts | 25 | 10 | | dry; flexible; slightly yellow. | dry; flexible; very slightly yellow. | dry; flexible; slightly yellow. | dry; yellow |
| 19 | 65 parts | 20 | 15 | | do | dry; flexible; slightly yellow. | do | Do. |
| 20 | 60 parts | 40 2-methoxy-ethyl ester of 12-acetoxystearic acid ($I_2$ no.:1.7). | | | extremely oily; extremely tacky; very flexible; brown spots. | extremely tacky; brown spots. | extremely tacky; very flexible; brown spots. | dry; clear; colorless. |
| 21 | 60 parts | 35 | 5 Paracril 26NS60. | | dry; very flexible; very slightly yellow. | dry; very flexible; very slightly yellow. | dry; very flexible; very slightly yellow. | Do. |
| 22 | 60 parts | 32.5 | 7.5 | | do | do | do | Do. |
| 23 | 60 parts | 30 | 10 | | do | dry; very flexible; slightly yellow. | dry; very flexible; slightly yellow. | dry; yellow. |
| 24 | 60 parts | 25 2-methoxy-ethyl ester of 12-acetoxystearic acid ($I_2$ no.:1.7). | 15 Paracril 26NS60. | | dry; flexible; very slightly yellow. | dry; flexible; slightly yellow. | dry; flexible; slightly yellow. | Do. |

TABLE I—Continued

| Expt. No. | Vinyl Resin | Plasticizer | Acrylonitrile Rubber | Weatherometer Light Aging | | | | Heat Aging |
| --- | --- | --- | --- | --- | --- | --- | --- | --- |
| | | | | 25 hrs. | 100 hrs. | 200 hrs. | 300 hrs. | 5 days at 100° C. |
| 25 | Geon 101—Cont. 60 parts | 20 | 20 | | dry; fairly flexible; yellow. | dry; fairly flexible; yellow. | dry; fairly flexible; yellow. | dry; yellow. |
| 26 | 55 parts | 40 | 5 | | dry; very flexible; very slightly yellow. | dry; very flexible; very slightly yellow. | very flexible; very slightly yellow. | dry; clear colorless. |
| 27 | 55 parts | 35 | 10 | | dry; very flexible; slightly yellow. | dry; very flexible; slightly yellow. | tiny oil spots; flexible; slightly yellow. | dry; yellow. |
| 28 | 55 parts | 30 | 15 | | dry; flexible; slightly yellow. | dry; flexible; slightly yellow. | dry; flexible; slightly yellow. | Do. |
| 29 | 55 parts | 25 2-methoxy-ethyl ester of 12-acetoxy-stearic acid (I₂ no.:1.7). | 20 Paracril 26NS60 | | do | dry; flexible; yellow. | dry; fairly flexible; yellow. | Do. |
| 30 | 50 parts | 50 | | | extremely oily; extremely tacky; very flexible; brown spots. | extremely tacky; brown spots. | extremely tacky; very flexible; brown spots. | dry; clear; colorless. |
| 31 | 50 parts | 45 | 5 Paracril 26NS60 | | dry; very flexible; very slightly yellow. | tiny oil spots; very flexible; very slightly yellow. | tiny oil spots; very flexible; very slightly yellow. | Do. |
| 32 | 50 parts | 42.5 | 7.5 | | do | dry; very flexible; very slightly yellow. | very flexible; very slightly yellow. | Do. |
| 33 | 50 parts | 40 2-methoxy-ethyl ester of 12-acetoxy-stearic acid (I₂ no.:1.7). | 10 Paracril 26NS60 | | do | dry; very flexible; slightly yellow. | dry; very flexible; slightly yellow. | dry; yellow. |
| 34 | 50 parts | 35 | 15 | | dry; very flexible; slightly yellow. | do | dry; very flexible; yellow. | Do. |
| 35 | 50 parts | 30 | 20 | | do | dry; flexible; slightly yellow. | dry; flexible; yellow. | Do. |
| 36 | 60 parts | 40 | | many tiny oil spots. | very tacky; oily. | extremely tacky; discolored. | extremely tacky; badly discolored. | slightly pink. |
| 37 | 60 parts | 39 | 1 | tiny oil spots. | very many tiny oil spots. | very tacky. | extremely tacky; discolored. | Do. |
| 38 | 60 parts | 38 | 2 | few tiny oil spots. | many tiny oil spots. | tacky | extremely tacky; slightly discolored. | Do. |
| 39 | 60 parts | 37 2-methoxyethyl ester of 12-acetoxy-stearic acid (I₂ no.: 1.7). | 3 Paracril 26NS60. | dry | tiny oil spots. | many tiny oil spots. | very many tiny oil spots. | slightly pink. |
| 40 | 60 parts | 36 | 4 | do | dry | dry | few tiny oil spots. | very slightly pink. |
| 41 | 70 parts | 30 | | many tiny oil spots. | tacky; oily. | extremely tacky. | extremely tacky; discolored. | pinkish brown. |
| 42 | 70 parts | 29 | 1 | tiny oil spots. | very many tiny oil spots. | very tacky. | very tacky; slightly discolored. | Do. |
| 43 | 70 parts | 28 | 2 | few tiny oil spots. | many tiny oil spots. | tacky | do | Do. |
| 44 | 70 parts | 27 | 3 | dry | tiny oil spots. | many tiny oil spots. | tacky | Do. |
| 45 | 70 parts | 26 | 4 | do | dry | dry | few tiny oil spots. | very slightly pinkish brown. |
| 46 | 65 parts | 30 2-methoxyethyl ester of 12-acetoxy-stearic acid (I₂ no.: 1.7). | 5 Hycar OR-25. | | | | few tiny oil spots; somewhat hazy. | clear; very slightly discolored. |

TABLE I—Continued

| Expt. No. | Vinyl Resin | Plasticizer | Acrylonitrile Rubber | Weatherometer Light Aging | | | | Heat Aging |
|---|---|---|---|---|---|---|---|---|
| | | | | 25 hrs. | 100 hrs. | 200 hrs. | 300 hrs. | 5 days at 100° C. |
| 47 | Geon 101—Cont. Plus polyvinyl chloride (in Geon Polyblend): 66.25 parts | 28.5 | 5.25 (in Geon Polyblend.) | dry | dry | dry | few tiny oil spots. | very slightly purple. |
| 48 | 63.75 parts | 27.25 | 9 | do | do | do | very few tiny oil spots. | yellow. |
| | VYNW: | | | | | | | |
| 49 | 70 parts | 30 | | slightly tacky. | extremely tacky. | extremely tacky; discolored. | tacky; brittle; badly discolored. | clear; colorless. |
| 50 | 63.75 parts | 27.25 | 9 Paracril 26NS60. | dry | dry | tiny oil spots. | dry | yellow. |
| 51 | 70 parts | 30 Methyl 12-acetoxy-stearate (I₂ no.: 2.8). | | slightly tacky. | very tacky. | extremely tacky; discolored. | tacky; brittle; badly discolored. | clear; colorless. |
| 52 | 63.75 parts | 27.25 | 9 Paracril 26NS60. | dry | dry | tiny oil spots. | dry | yellow. |
| | Geon 202: | | | | | | | |
| 53 | 70 parts | 30 2-methoxyethyl ester of 12-acetoxy-stearic acid (I₂ no.: 1.7). | | slightly tacky. | extremely tacky. | extremely tacky; discolored. | tacky; brittle; badly discolored. | clear; colorless. |
| 54 | 63.75 parts | 27.25 | 9 Paracril 26NS60. | dry | dry | tiny oil spots. | dry | yellow. |
| 55 | 70 parts | 30 Methyl 12-acetoxy-stearate (I₂ no.: 2.8). | | tacky | extremely tacky; discolored. | extremely tacky; very badly discolored. | tacky; brittle; very badly discolored. | clear; colorless. |
| 56 | 63.75 parts | 27.25 Methyl 12-acetoxy-stearate (I₂ no.: 2.8). | 9 Paracril 26NS60. | dry | dry | tiny oil spots. | dry | yellow. |
| | VYNS: | | | | | | | |
| 57 | 75 parts | 25 2-methoxyethyl ester of 12-acetoxy-stearic acid (I₂ no.: 1.7). | | | very oily; very tacky; brown spots. | extremely tacky; brown spots. | extremely tacky; brown. | dry; clear; colorless. |
| 58 | 75 parts | 21 | 4 | | dry; flexible; very slightly yellow. | very slightly yellow. | flexible; very slightly yellow. | dry; clear; very slightly pink. |
| 59 | 75 parts | 17.5 | 7.5 | | do | do | dry; flexible; very slightly yellow. | dry; clear; colorless. |
| | Geon 101: | | | | | | | |
| 60 | 60 parts | 35 | 5 Butaprene NF-NSP75. | | dry; very flexible; very slightly yellow. | dry; very flexible; very slightly yellow. | dry; very flexible; very slightly yellow. | Do. |
| 61 | 60 parts | 35 2-methoxyethyl ester of 12-acetoxy-stearic acid (I₂ no.:1.7). | 5 Chemigum N3 | | do | do | do | Do. |
| 62 | 60 parts | 35 benzyl 12-propionoxy-stearate (I₂ no.:10.0). | 5 Paracril 26NS60 | | do | do | do | Do. |
| 63 | 60 parts | 35 cyclohexyl 12-stearoxy-stearate (I₂ no.: 7.5). | 5 | | do | do | do | Do. |
| 64 | 60 parts | 35 tetrahydro-furfuryl 12-abietoxy-stearate (I₂ no.:15.0). | 5 | | do | do | do | Do. |
| 65 | 60 parts | 35 phenyl 12-toluoxy stearate (I₂no.:3.8). | 5 | | do | do | do | Do. |
| 66 | 60 parts | 35 2-ethyl-hexyl ester of 12-furoxystearic acid (I₂ no.:10.5). | 5 Paracril 26NS60 | | do | do | do | Do. |
| 67 | 60 parts | 35 cetyl 12-acetoxy-stearate (I₂ no.:13.0). | 5 | | do | do | do | Do. |
| 68 | 60 parts | 35 2-benzyloxy-propyl ester of 12-acetoxystearic acid (I₂ no.:6.0). | 5 | | do | do | do | Do. |

TABLE I—Continued

| Expt. No. | Vinyl Resin | Plasticizer | Acrylonitrile Rubber | Weatherometer Light Aging | | | | Heat Aging |
| --- | --- | --- | --- | --- | --- | --- | --- | --- |
| | | | | 25 hrs. | 100 hrs. | 200 hrs. | 300 hrs. | 5 days at 100° C. |
| 69 | Geon 101—Con. 60 parts | 35 ester of mono-butyl ether of diethylene glycol and 12-propionoxy-stearic acid (I₂ no.:3.3.). | 5 | | dry; very flexible; very slightly yellow. | dry; very flexible; very slightly yellow. | dry; very flexible; very slightly yellow. | dry; clear; colorless. |
| 70 | 65 parts | 30 2-methoxy ethyl ester of 12-acetoxystearic acid (I₂ no.:1.7). | (¹) | | | | very tacky; brittle; badly discolored. | |

¹ This composition also contained 5 parts of Deenax, an Enjay Co. rubber antioxidant.

What is claimed is:

1. A vinyl resin composition which is stable to heat and light, comprising (a) from about 50 to about 75% by weight of a polymerization product comprising a polymer of a vinyl halide, and, as a plasticizer therefor; (b) from about 20% to about 42.5% by weight of an ester of 12-hydroxystearic acid having the following formula:

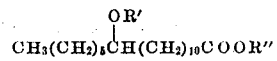

$$CH_3(CH_2)_5\overset{OR'}{\underset{|}{C}H}(CH_2)_{10}COOR''$$

wherein R' is an acyl group derived from a monocarboxylic acid selected from the group consisting of aliphatic, cycloaliphatic, araliphatic, aromatic, and heterocyclic acids containing less than 23 carbon atoms per molecule, and R" is a monovalent radical derived from a monohydroxy compound selected from the group consisting of aliphatic, cycloaliphatic, araliphatic, and heterocyclic alcohols, phenols, and alkoxy-substituted derivatives of said alcohols and phenols, said ester having an iodine number of not more than about 15; and (c) from about 4% to about 7.5% by weight of a rubbery copolymer of a butadiene-1,3 and an acrylic nitrile, said copolymer being formed from a mixture comprising a butadiene-1,3 and an acrylic nitrile in the proportion of from about 1.22 to about 5.67 parts of the butadiene component per part of acrylic nitrile.

2. The composition of claim 1, in which said polymerization product is polyvinyl chloride, said ester of 12-hydroxystearic acid is the 2-methoxy-ethyl ester of 12-acetoxystearic acid, and said rubbery copolymer is a copolymer of a mixture comprising butadiene-1,3 and acrylonitrile in the proportion of from about 1.5 to about 4.0 parts of butadiene-1,3 per part of acrylonitrile.

3. The composition of claim 1, in which said polymerization product is a copolymer of vinyl chloride and vinyl acetate containing from about 85% to about 95% by weight of vinyl chloride, said ester of 12-hydroxystearic acid is methyl 12-acetoxy stearate, and said rubbery copolymer is a copolymer of a mixture comprising butadiene-1,3 and acrylonitrile in the proportion of from about 1.5 to about 4.0 parts of butadiene-1,3 per part of acrylonitrile.

4. The composition of claim 1, in which said polymerization product is a copolymer of vinyl chloride and vinylidene chloride containing from about 95% to about 99% by weight of vinyl chloride, said ester of 12-hydroxystearic acid is butyl 12-acetoxystearate, and said rubbery copolymer is a copolymer of a mixture comprising butadiene-1,3 and acrylonitrile in the proportion of from about 1.5 to about 4.0 parts of butadiene-1,3 per part of acrylonitrile.

5. The composition of claim 1, in which the said polymerization product is a copolymer of vinyl chloride and a member of the class consisting of vinyl acetate and vinylidene chloride.

6. The composition of claim 1, in which R' of the formula of said ester of 12-hydroxystearic acid represents an acyl group derived from an aliphatic mono-carboxylic acid.

7. The composition of claim 1, in which R" of the formula of said ester of 12-hydroxystearic acid represents a monovalent radical derived from a monohydric aliphatic alcohol.

8. The composition of claim 1, in which R" of the formula of said ester of 12-hydroxystearic acid represents a monovalent radical derived from an alkoxy-substituted monohydric aliphatic alcohol.

TEMPLE C. PATTON.
LOUIS J. JUBANOWSKY.

REFERENCES CITED

The following references are of record in the file of this patent:

UNITED STATES PATENTS

| Number | Name | Date |
| --- | --- | --- |
| 2,500,918 | Reuter et al. | Mar. 14, 1950 |

OTHER REFERENCES

Kenney article in Modern Plastics, September 1946 (pages 106 and 107).